United States Patent
Marioni

(10) Patent No.: US 8,766,580 B2
(45) Date of Patent: Jul. 1, 2014

(54) METHOD FOR CONTROLLING THE DISCHARGE PUMP OF A HOUSEHOLD APPLIANCE AND PROCESSING UNIT FOR IMPLEMENTING SAID METHOD

(75) Inventor: Elio Marioni, Dueville (IT)

(73) Assignee: Askoll Holding S.r.l. (IT)

( * ) Notice: Subject to any disclaimer, the term of this patent is extended or adjusted under 35 U.S.C. 154(b) by 466 days.

(21) Appl. No.: 13/269,218

(22) Filed: Oct. 7, 2011

(65) Prior Publication Data

US 2012/0087805 A1 Apr. 12, 2012

(30) Foreign Application Priority Data

Oct. 11, 2010 (EP) ...................................... 10425330

(51) Int. Cl.
*H02P 6/00* (2006.01)

(52) U.S. Cl.
CPC ...................................... *H02P 6/008* (2013.01)
USPC ............ 318/400.35; 318/400.34; 318/400.32; 318/400.01; 318/700

(58) Field of Classification Search
CPC .................................. H02P 6/008; H02P 27/16
USPC ............. 318/400.35, 400.34, 400.32, 400.01, 318/700

See application file for complete search history.

(56) References Cited

U.S. PATENT DOCUMENTS

| 7,166,974 B2 * | 1/2007 | Aarestrup ................ 318/400.35 |
| 2007/0122289 A1 | 5/2007 | Marioni |
| 2010/0201303 A1 | 8/2010 | Acquaviva |

FOREIGN PATENT DOCUMENTS

| DE | 19546145 A1 | 6/1996 |
| EP | 0945973 A2 | 9/1999 |

* cited by examiner

*Primary Examiner* — David Luo
(74) *Attorney, Agent, or Firm* — Akerman LLP

(57) ABSTRACT

A method for controlling a discharge pump of a household appliance, including starting a synchronous electric motor that actuates said discharge pump until the synchronism condition is reached, and driving said synchronous electric motor at a steady state through phase control by varying the firing angle ($\alpha$). In driving said synchronous motor at steady state through phase control, said firing angle ($\alpha$) is feedback controlled to cancel the phase difference between the mid-point of a zero current plateau of a function of the phase current fed to the electric motor and the zero-crossing point of a counter electromotive force signal (fcem) relative to the same phase. In feedback controlling the firing angle ($\alpha$), the synchronous electric motor is switched off if the required firing angle ($\alpha$) exceeds a maximum threshold ($\alpha_{lim}$), which may result from the operation of the discharge pump in air-water conditions.

15 Claims, 4 Drawing Sheets

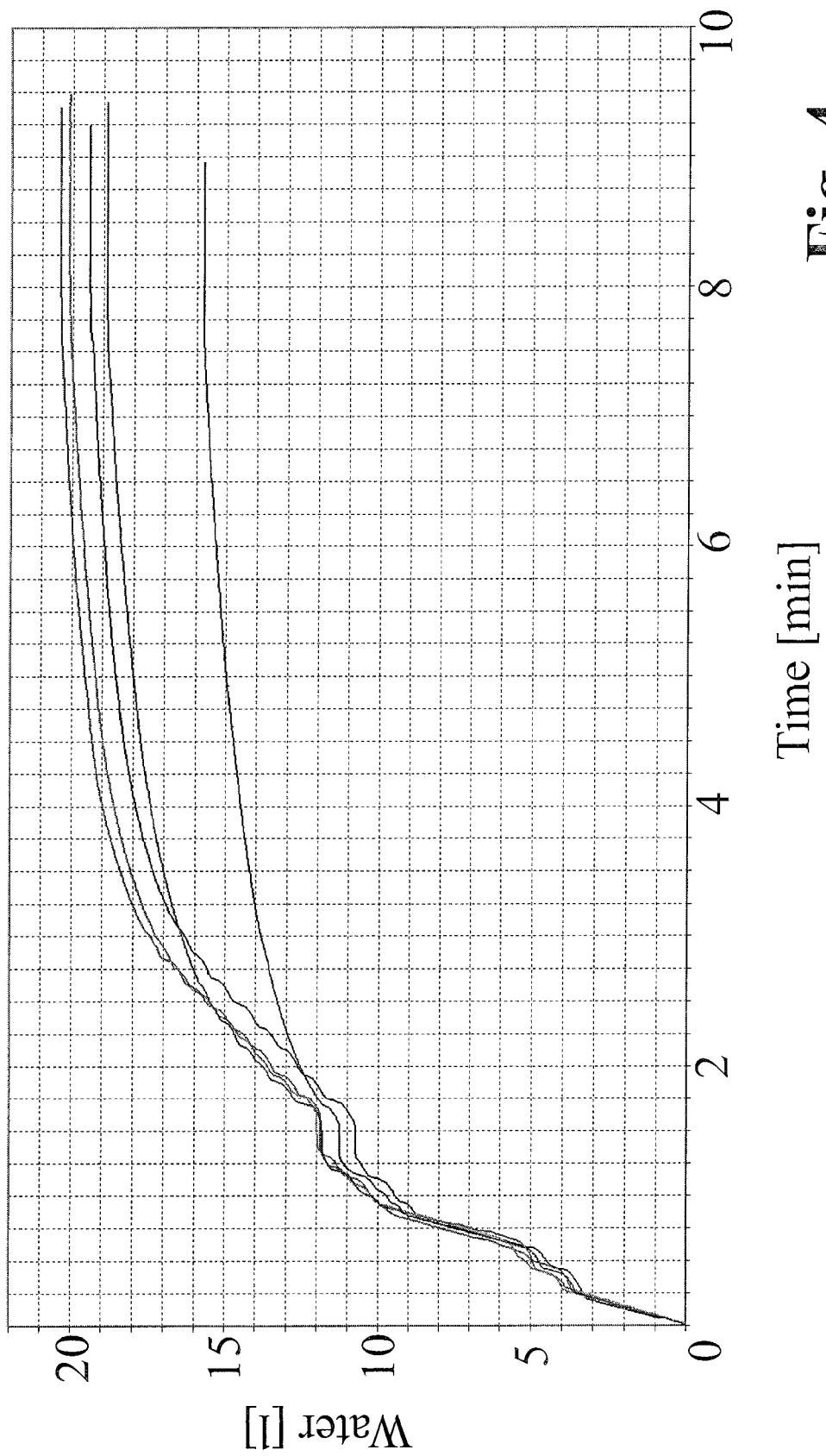

METHOD FOR CONTROLLING THE DISCHARGE PUMP OF A HOUSEHOLD APPLIANCE AND PROCESSING UNIT FOR IMPLEMENTING SAID METHOD

FIELD OF APPLICATION

The present invention, in its most general aspect, refers to a method for controlling a discharge pump of a household appliance, as well as to a processing unit specifically provided for implementing said method.

In particular, the method aims to control a discharge pump actuated by a synchronous electric motor used in a washing machine.

PRIOR ART

Various household appliances, such as washing machines and dishwashers, comprise a discharge pump inside them in order to expel the water used in washing towards the waste water network.

Such a discharge pump must have low production and assembly costs and low bulk, whilst still respecting given requirements of reliability and durability.

In particular, discharge pumps actuated by permanent magnet synchronous electric motors meet the aforementioned requirements and are currently widely used. These motors are generally small in size, of the single-phase or two-phase type, managed by low cost control electronics that is limited to managing the starting and stopping of the motor, also detecting possible blocking or overheating conditions.

Although cost-effective, such a solution does, however, have the drawback of not allowing the air-water condition operating states of the discharge pump to be immediately identified. In such operating states the electric motor does not have optimal energy efficiency; moreover, they are very noisy.

Other problems can derive from the limited stability of the motor, unsuitable for responding to sudden variations in load and above all from the need to ensure the mechanical starting of the motor itself.

The technical problem forming the basis of the present invention is, therefore, to devise a method for controlling a discharge pump of the aforementioned type and a respective processing unit provided for implementing it that allow energy optimisation of the motor and the management of the air-water condition operating states of the discharge pump, without having an excessive impact upon the production and installation costs, and definitively eliminating the functional limitations of the mechanical starting pumps.

SUMMARY OF THE INVENTION

The aforementioned technical problem is solved by a method for controlling a discharge pump of a household appliance, comprising the following steps:

starting a synchronous electric motor that actuates said discharge pump until the synchronism condition is reached;

driving said synchronous electric motor at steady state through phase control by varying the firing angle;

wherein, in driving said synchronous motor at steady state through phase control, said firing angle is feedback controlled to cancel the phase shift between the mid-point of a zero current plateau of a function of the phase current fed to the electric motor and the zero-crossing point of a counter electromotive force signal relative to the same step;

wherein, in feedback controlling the firing angle, the synchronous electric motor can be switched off if the required firing angle exceeds a maximum threshold, where exceeding said maximum threshold may result from the operation of the discharge pump in air-water conditions.

Said maximum threshold can be calculated as a function of the voltage of an electrical grid that feeds said electric motor, in particular it can be calculated as a linear function of the voltage of said electrical grid.

After the electric motor has been switched off by the maximum threshold being exceeded by the required firing angle, the electric motor can advantageously be started up again after a given temporary switched off time.

Said temporary switched off time can be calculated according to a decreasing function (for example an inverse proportionality function) of the full flow operating time prior to switching off.

Preferably, said temporary switched off time is calculated so as not to exceed a predefined maximum limit.

During the course of the same discharge operation of the discharge pump, for example relative to a spinning step of a washing machine served by the pump itself, the subsequent temporary switched off times can be set according to a predefined progression. Said progression will preferably be an increasing one until it stabilises on a maximum limit value.

The method can comprise a resetting step of the pump that provides an interruption of the power supply of a processing unit intended to calculate the temporary switched off times to restore all of the variables that influence said calculation to an initial value.

During the step of driving said electric motor at steady state, it can be fed with power only when both of the following conditions are met: the counter electromotive force signal must have the same sign as the grid voltage and the counter electromotive force signal must be going away from zero.

Whether the synchronism condition has been reached can be evaluated through measurement of the phase shift between phase current and voltage, said condition being reached when such a phase shift stays constant for a given number of consecutive periods. If the synchronism condition is not reached within a predetermined time period, the method can restart the electric motor. Moreover, if the synchronism condition is not reached after a predefined number of starting attempts, the method can stop the electric motor definitively.

The aforementioned technical problem is also solved by a processing unit for controlling a discharge pump, intended to control a power supply switch for a synchronous electric motor that actuates said discharge pump implementing the control method according to the ways described above.

Further characteristics and advantages of the present invention will become clear from the following description of a preferred embodiment given for indicating and not limiting purposes with reference to the attached drawings.

BRIEF DESCRIPTION OF THE DRAWINGS

FIG. 4 shows the temporal progression of the amount of water discharged by a washing machine during a spinning step.

DETAILED DESCRIPTION

Figure 1:
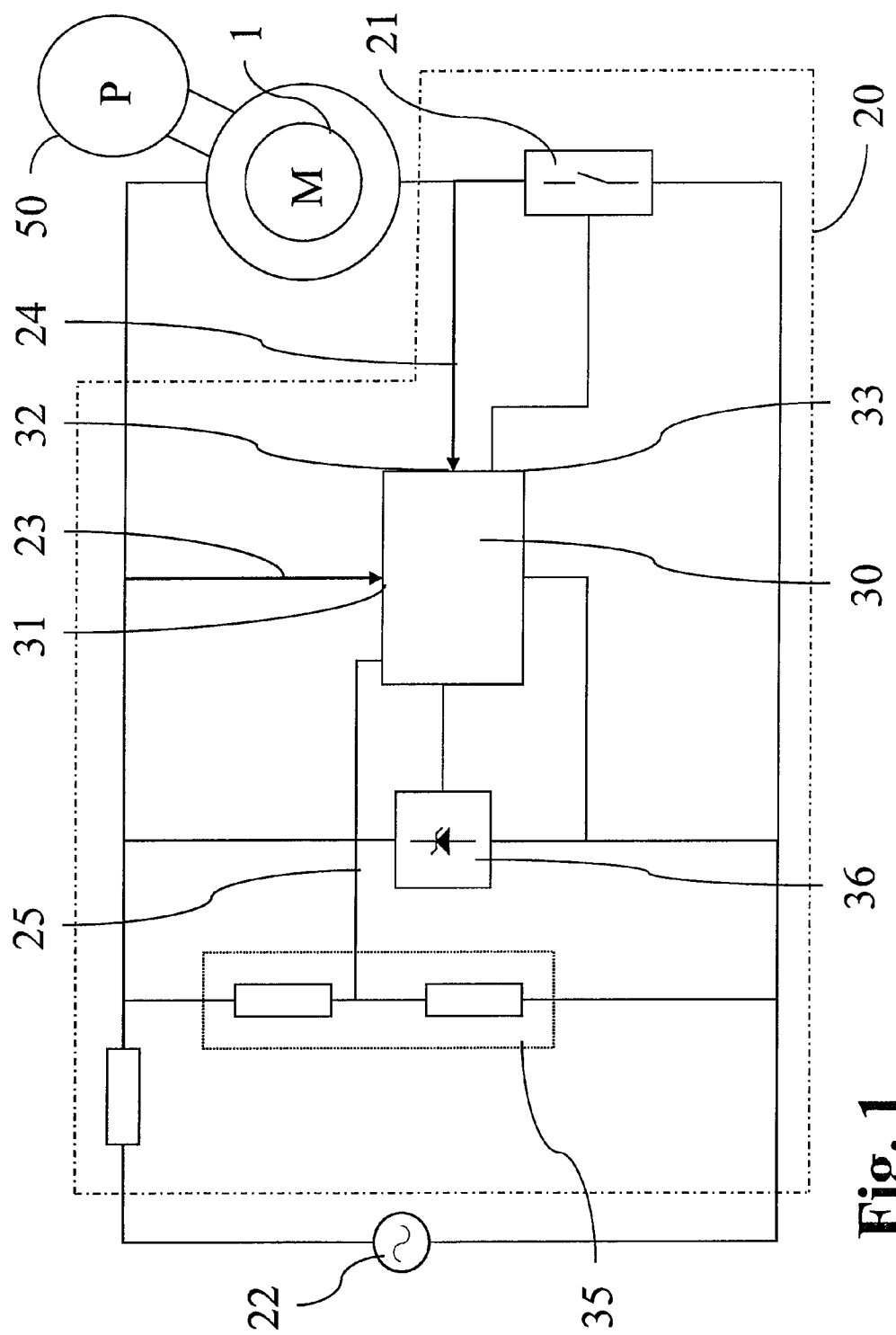
FIG. 1 schematically represents an electronic device associated with a motor-discharge pump group, said electronic device comprising a processing unit according to the present invention.

With reference to the attached FIG. 1 a discharge pump of a household appliance, in particular of a washing machine (not represented in the attached figures), is identified with 50. The discharge pump 50 is associated with a sump for collecting the washing machine water, and it is intended to empty it at given washing steps carried out by the household appliance.

The discharge pump 50, of the known type, is actuated by means of an electric motor 1, which in this case is in the form of a single-phase permanent magnet synchronous motor.

An electronic device 20, which preferably takes the form of a control card, is associated with the electric motor 1 and is intended to drive it through phase control.

Said electronic device 20 comprises a static switch 21, in this specific case a TRIAC switch, intended to cut the current supplied by an A.C. electrical grid 22 and directed to the windings for supplying power to the electric motor 1.

The TRIAC switch 21 is connected to a PWM output 33 of a processing unit 30, which preferably takes the form of a microprocessor.

The electronic device 20 has a portion for synchronisation with the grid 35 that sends the processing unit 30 a grid synchronising signal 25, i.e. a signal having a unitary value when the voltage of the electrical grid has positive values, a zero value when the latter takes negative values; the timer for controlling the PWM output 33 is advantageously synchronised with the grid synchronising signal.

Moreover, the electronic device 20 has a power supply portion 36 of the processing unit 30, also intended to supply said unit with a voltage reference signal.

The processing unit 30 has a first input 31, which receives a grid voltage signal 23, and a second input 32, which on the other hand receives a voltage signal across the switch 24.

By processing such signals, the processing unit 30 is able to carry out an indirect measurement of the counter electromotive force generated by the synchronous motor 1, obtained as the difference between the grid voltage signal 23 and the voltage signal across the switch 24, at the moments in which the current is zero. The processing unit 30 detects said zero current condition by always evaluating the voltage signal across the switch 24, and in particular ensuring that such a signal differs sufficiently from the zero value.

The method for controlling a discharge pump 50 according to the present invention has an initial step of starting the electric motor 1 that actuates the discharge pump 50 itself.

Figure 2:
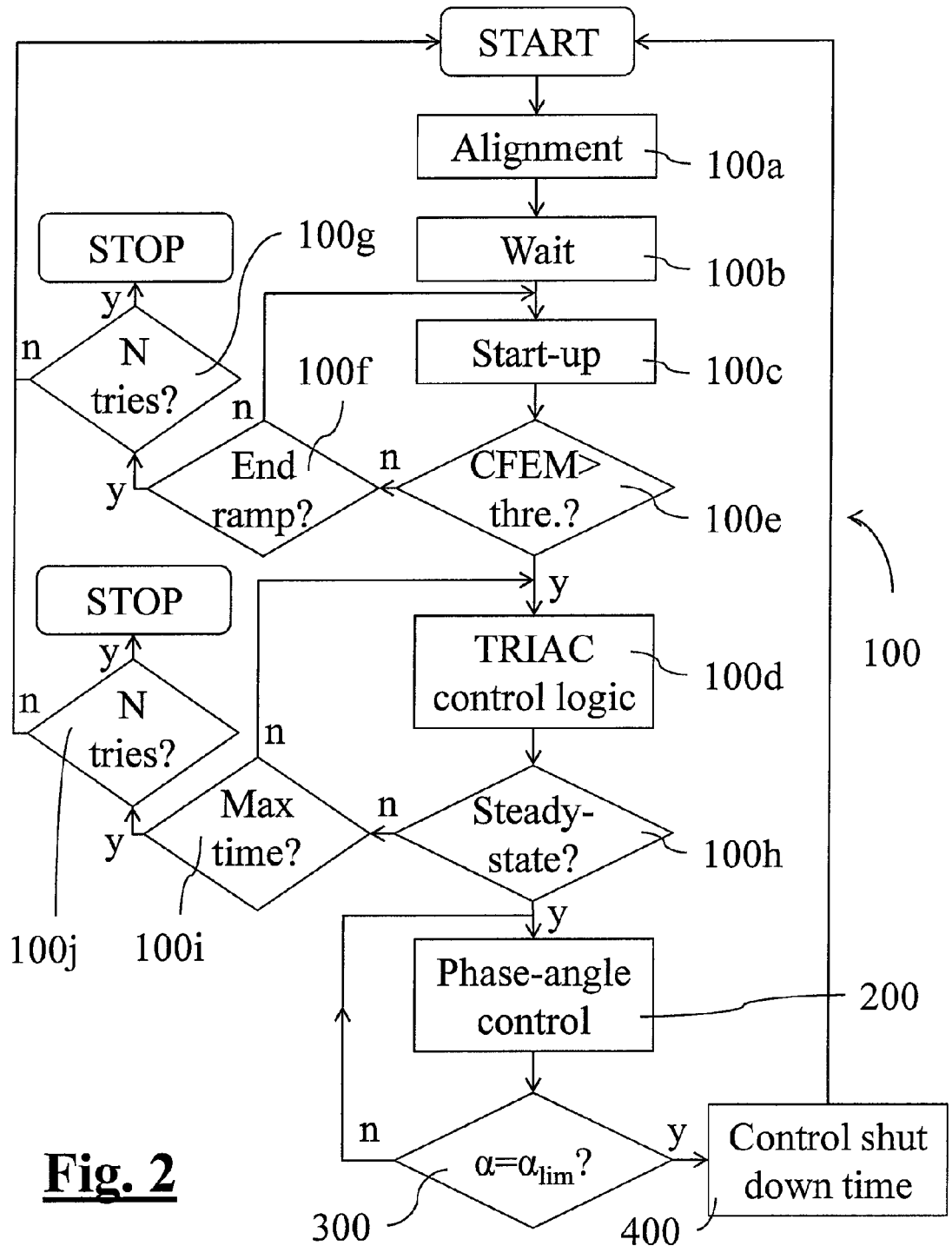
FIG. 2 represents a block diagram that summarily illustrates the various steps of the method according to the present invention.

Such an initial starting step, identified with 100 in the block diagram of FIG. 2, comprises four successive sub-steps: alignment, waiting, starting, transition towards steady state.

The alignment sub-step (block 100a in FIG. 2) is aimed at taking the rotor of the electric motor 1 into a predefined starting position.

In order to obtain this result, the processing unit 30 controls the TRIAC switch 21 so as to supply the windings of the motor with a series of pulses of current generated only during a given half-period, positive or negative according to the selected starting position, of the voltage signal of the electrical grid 22. In terms of application, the TRIAC switch must thus be switched on only when the grid synchronising signal 23 takes positive values (or negative ones according to the selected half-period).

The subsequent waiting sub-step (block 100b in FIG. 2) is aimed at allowing possible oscillations of the rotor of the electric motor 1 to damp out. At the end of the waiting step, it is thus certain that the rotor is stopped in the predefined starting position.

The subsequent starting sub-step (block 100c in FIG. 2) is aimed at ensuring that the electric motor 1 actually starts.

For this purpose the processing unit 30 generates a series of pulses of current of increasing intensity (adjusted by varying the firing angle $\alpha$ in the phase control) generated this time in the half-period of the voltage signal of the electrical grid 22 opposite to that of the pulses of the alignment step.

When the counter electromotive force signal exceeds a predetermined control threshold (verification block 100e), the last sub-step of transition towards steady state begins (block 100d in FIG. 2).

If, on the other hand, the control threshold for the counter electromotive force is not reached by the end of the series of pulses (verification block 100f), the control method implemented carries out the first starting sub-steps once again. If the control threshold continues to not be reached for a given number of consecutive attempts to start (verification block 100g), the electric motor 1 can be stopped definitively.

The last sub-step is aimed at driving the motor until the synchronism speed is reached.

In this last sub-step, the processing unit 30 controls the motor according to a specific firing logic that tends to keep the TRIAC switch 21 conducting only when the transit of current in the power supply windings of the electric motor 1 determines a drive torque in the direction of rotation of the rotor.

In particular, the TRIAC switch 21 is switched on when both of the following conditions occur:
 a) the estimated counter electromotive force signal must have the same sign as the grid voltage;
 b) the estimated counter electromotive force signal must be going away from zero.

Once the synchronism condition of the synchronous electric motor 1 has been reached, starting is complete.

Such a condition is evaluated (verification block 100h) through the measurement of the phase shift between phase current and voltage. If such a phase shift stays practically constant for a given number of consecutive periods, the synchronism condition is considered to have been reached. If the synchronism condition is not reached within a predefined time period (verification block 100i), the method carries out the starting step once again from the beginning. After a given number of consecutive failed starting attempts (verification block 100j), the electric motor 1 can be stopped definitively.

This is followed in the method according to the present invention by a step of driving said synchronous electric motor 1 at steady state through phase control, i.e. by varying the firing angle $\alpha$ that determines the delay in switching on the TRIAC switch with respect to the change of sign of the grid voltage.

The phase control is progressively introduced, keeping the conditions a) and b) on the switching on of the switch 21 applied in the aforementioned transition sub-step.

In this driving step, identified with 200 in FIG. 2, the firing angle $\alpha$ is feedback controlled, in order to optimise the energy performance of the electric motor 1.

To be specific the feedback control takes place by identifying the ideal operating condition of the motor as where the counter electromotive force function passes through zero at a mid-point 80a of the zero current plateau 80 set by the closing of the TRIAC switch 21. Of course, the extension of the zero current plateau 80 and the relative position of its mid-point 80a depend on the value of the firing angle α used for each current half-period.

The condition sought corresponds to zeroing the phase shift between the power supply current of the windings and the counter electromotive force generated of the synchronous motor 1, a condition that as known ensures that the energy efficiency of the synchronous motor itself is optimised (disregarding core).

Thanks to the counter electromotive force signal processed inside it according to the ways described earlier, the processing unit 30 is able to evaluate how the behaviour of the motor differs from the ideal operating condition, consequently correcting the firing angle α of the TRIAC switch 21 in feedback.

Figure 3:
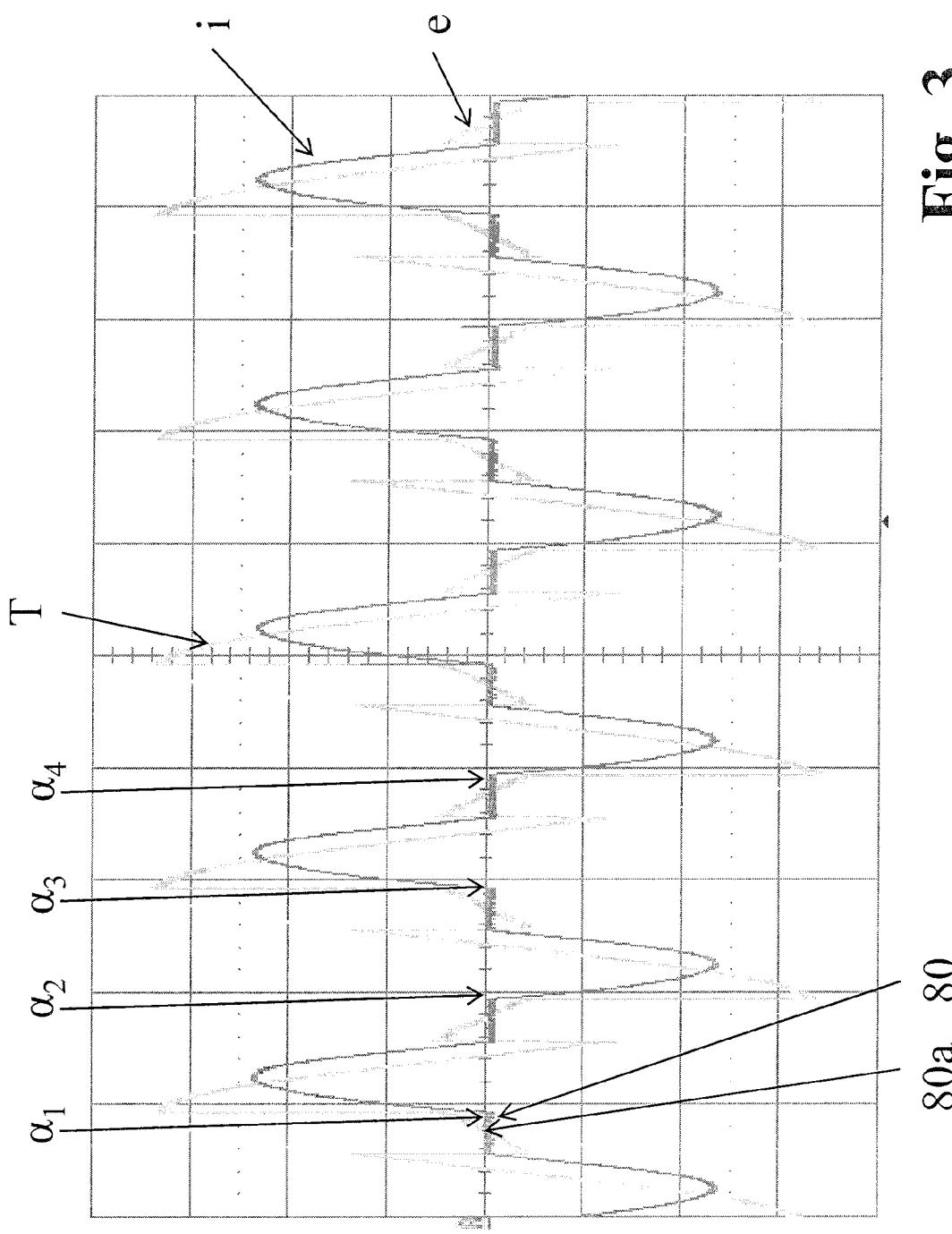
FIG. 3 shows the temporal progression of some parameters relative to the motor-pump group of FIG. 1 during the control carried out with the method according to the present invention.

FIG. 3 illustrates the temporal progression of the counter electromotive force e, of the grid voltage T and of the stator current during the normal operation of the synchronous motor 1; the firing angles used in the first half-periods are indicated with the Greek letter a followed by progressively increasing subscripts.

During driving at steady state, the method according to the present invention continuously checks that the discharge pump 1 is not working in air-water conditions (verification block 300). In such conditions the decrease in load causes a great increase in the need to cut the current in the feedback control algorithm. Thus the method in every half-period verifies that the firing angle α required by the feedback control does not exceed a maximum threshold $α_{lim}$, indeed indicative of operation in air-water conditions of the pump.

Advantageously, given that the required cutting also depends on the grid voltage, said maximum threshold $α_{lim}$ is obtained as a linear function of the grid voltage itself, according to a formula $$α_{lim} = k \cdot V_{grid} + c$$

with k and V preset parameters.

It should be noted that such a limit value must be set so as to exceed the maximum firing angle α, experimentally obtained, that the motor-pump group can require in full flow operation for every load condition required by the installation of the washing machine on which the pump is installed, where full flow operation is meant to be the opposite of the operation in air-water conditions.

When the aforementioned verification detects operation in air-water conditions, the method can provide entry into a temporary switched off step of the electric motor 1 (block 400 in FIG. 2), i.e. the electronic device 20 interrupts the power supply to the windings of the synchronous motor for a temporary switched off time.

Once the temporary switched off time has run out, the motor is restarted by repeating the starting step 100 described above.

The method according to the present invention can determine the temporary switched off time of the electric motor 1 according to different alternative ways. In particular, hereafter two ways are described that are particularly suitable for the management of the discharge pump 50 during a spinning step of the washing machine with which the pump is associated.

A first way uses a calculation algorithm calibrated on the previous full flow operating time of the motor-pump group, i.e. the time between the start of the last starting step 100 and the moment of detection of the air-water conditions. Of course, in order to allow the temporary switched off time to be determined according to said way requires that said full flow operating time be adjusted by the processing unit 30.

From such data, the switched off time is calculated according to a decreasing function of the previous full flow operating time. In other words, the longer the full flow operating period of the motor-pump group, the shorter the switched off period that follows it.

Such a relationship is justified by the fact that the full flow operating time is indicative of the amount of water present in the sump of the washing machine. When there is still a lot of water, a short wait is sufficient to ensure that full flow operating conditions are restored; when there is little water, on the other hand, it is necessary to wait longer to allow the load of laundry to release part of the water held raising the level in the sump.

It should be noted that it is nevertheless suitable for the temporary switched off time to not exceed the maximum limit, beyond which would risk an accumulation of water that is greater than the capacity of the sump.

The switched off time can be calculated from the full flow operating time using an inverse proportionality formula suitably modified to prevent the switched off time from exceeding the aforementioned maximum limit.

The method can comprise a resetting step of the pump that foresees interrupting the power supply to the processing unit 30 if it is necessary to reset the value of the full flow operating time adjusted there, for example at the end of an unsuccessful spinning attempt.

The second way that can be adopted by the method according to the present invention uses progressively increasing temporary switched off times. The first time an air-water condition is detected, the method switches off the electric motor for a first predefined time, for example 2 s; upon the next detection a second predefined time longer than the first, for example 4 s, will be applied; and so on following a progression of increasing times up to a maximum limit, for example 20 s. Once the maximum limit is reached, the progression stops and the switched off time is stabilised on such a value.

In fact, experimental results demonstrate that during the spinning step the water discharged by a washing machine decreases over time. FIG. 4 for example illustrates the temporal progression of the water discharged by a discharge pump of a washing machine, loaded with 8 kg of sponge, during a spinning step. The different curves refer to different spinning speeds. As can be seen, at all speeds most of the water is discharged in the first steps of the operation.

Also in this second way, the method provides a resetting step of the pump in which the power supply of the processing unit 30 is interrupted as needed in order to restore the progression of the temporary switched off times to the initial value.

The method and the processing unit described above have a series of advantages listed below.

A first advantage derives from the fact that the method and processing unit allow energy-efficient and relatively quiet operation, in particular preventing steps of operation in air-water condition of the discharge pump.

A second advantage is represented by the fact that the system is self-adapting, given that the implemented control seeks to cancel the phase shift between current and counter electromotive force irrespective of the work point in which the discharge pump is working.

In particular, the system seeks energy optimisation irrespective of the height of installation of the discharge pipe, within the limits set by the manufacturer of the machine.

Another advantage, due to the fact that there is a control that automatically makes the motor work in the most energy-efficient condition, concerns the safety of the application.

Let us take the example of the case of failure by blocking of the electrovalve, in which the washing machine continually loads water from the water mains, making the discharge pump work continuously and for most of the time in air-water conditions. Since in this case the power absorbed is continually kept at the minimum necessary, the pump is prevented from overheating, and it is thus able to work without interruptions.

A further advantage derives from the automatic detection of loss of synchronism or of blocking of the rotor of the electric motor that actuates the discharge pump. Indeed, the conditions to allow the windings of the machine to be supplied with power require the measurement of a non-zero counter electromotive force value.

Yet another advantage concerns the use of the PWM output that allows fine adjustment of the delay in switching on the TRIAC switch (with resolution of a few μs), the methods and the devices described allow a substantial stability of the control and therefore of the motor.

In particular, such an aspect ensures good reactivity and precision in response to variation of voltage and load, which in the example of application of an electropump can be due to air bubbles or the presence of foreign objects in the rotation chamber.

It is also possible to work close to the limit angle beyond which the motor would lose its step, given the reactivity with which it is possible to correct the control.

This gives a further advantage given that, being able to work in optimal conditions over the entire operating voltage range, there is increased efficiency of the device.

Of course, a man skilled in the art can bring numerous modifications and variants to the method and to the device described above, in order to satisfy contingent and specific requirements, all of which are in any case covered by the scope of protection of the invention as defined by the following claims.

The invention claimed is:

1. A method for controlling a discharge pump of a household appliance, comprising the following steps:
    starting a synchronous electric motor that actuates said discharge pump until the synchronism condition is reached;
    driving said synchronous electric motor at normal operating speed through phase control by varying the firing angle ($\alpha$);
    wherein, in driving said synchronous motor at steady state through phase control, said firing angle ($\alpha$) is feedback controlled to cancel the phase difference between the mid-point of a zero current plateau of a function of the phase current fed to the electric motor and the zero-crossing point of a counter electromotive force signal (fcem) relative to the same phase;
    wherein, in feedback controlling the firing angle ($\alpha$) the synchronous electric motor is switched off if the required firing angle ($\alpha$) exceeds a maximum threshold ($\alpha_{lim}$), where exceeding said maximum threshold ($\alpha_{lim}$) may result from the operation of the discharge pump in air-water conditions.

2. The method according to claim 1, wherein said maximum threshold ($\alpha_{lim}$) is calculated as a function of the voltage of an electrical grid that feeds said electric motor.

3. The method according to claim 2, wherein said maximum threshold ($\alpha_{lim}$) is calculated as a linear function of the voltage of said electrical grid.

4. The method according to claim 1, wherein, after switching off the electric motor due to the maximum threshold ($\alpha_{lim}$) being exceeded by the required firing angle ($\alpha$), the electric motor is started up again after a given temporary switched off time.

5. The method according to claim 4, wherein said temporary switched off time is calculated according to a decreasing function of the full flow operating time prior to switching off.

6. The method according to claim 5, wherein said temporary switched off time is calculated according to a inverse proportionality function of the full flow operating time prior to switching off.

7. The method according to claim 5, wherein said temporary switched off time is calculated so as not to exceed a predefined maximum limit.

8. The method according to claim 5, wherein, during a single, discharge operation of the discharge pump, the subsequent temporary switched off times are set according to a predefined progression.

9. The method according to claim 8, wherein said predefined progression is an increasing progression that stabilises on a maximum limit value.

10. The method according to claim 5, also comprising a reset step of the pump in which the power supply of a processing unit intended to calculate the temporary switched off times is interrupted to restore all of the variables that influence said calculation to an initial value.

11. The method according to claim 1, wherein during the step of driving said electric motor at steady state, it can only be supplied with power when both of the following conditions are met: the counter electromotive force signal must have the same sign as the grid voltage and the counter electromotive force signal must be going away from zero.

12. The method according to claim 1, wherein the reaching of the synchronism condition is evaluated through measurement of the phase shift between phase current and voltage, said condition being reached when such a phase shift is kept constant for a given number of consecutive periods.

13. The method according to claim 12, wherein if the synchronism condition is not reached within a predefined time period the electric motor is restarted.

14. The method according to claim 13, wherein if the synchronism condition is not reached after a predefined number of starting attempts, the electric motor is stopped definitively.

15. A processing unit for controlling a discharge pump, said processing unit being arranged to control a switch for supplying power to a synchronous electric motor that actuates said discharge pump implementing the control method according to claim 1.

* * * * *